(12) United States Patent
Kondo (10) Patent No.: US 11,541,927 B2
(45) Date of Patent: Jan. 3, 2023

(54) BALL SCREW NUT, TURNING UNIT, AND METHOD FOR MANUFACTURING BALL SCREW NUT

(71) Applicant: JTEKT CORPORATION, Osaka (JP)

(72) Inventor: Yoshio Kondo, Okazaki (JP)

(73) Assignee: JTEKT CORPORATION, Kariya (JP)

( * ) Notice: Subject to any disclaimer, the term of this patent is extended or adjusted under 35 U.S.C. 154(b) by 185 days.

(21) Appl. No.: 17/075,843

(22) Filed: Oct. 21, 2020

(65) Prior Publication Data

US 2021/0122411 A1 Apr. 29, 2021

(30) Foreign Application Priority Data

Oct. 28, 2019 (JP) .............................. JP2019-194949

(51) Int. Cl.
| | | |
|---|---|---|
| *F16H 25/22* | (2006.01) | |
| *B62D 5/04* | (2006.01) | |
| *F16H 25/24* | (2006.01) | |
| *F16H 55/48* | (2006.01) | |

(52) U.S. Cl.
CPC ....... *B62D 5/0448* (2013.01); *F16H 25/2204* (2013.01); *F16H 25/24* (2013.01); *F16H 55/48* (2013.01)

(58) Field of Classification Search
CPC ..... F16H 2025/2096; F16H 2025/2481; F16H 25/24; F16H 55/48; F16H 55/06; B62D 5/0448
See application file for complete search history.

(56) References Cited

U.S. PATENT DOCUMENTS 11,242,086 B2 * 2/2022 Sato ...................... F16C 27/066

FOREIGN PATENT DOCUMENTS

| EP | 3409976 A1 | 12/2018 | | |
|---|---|---|---|---|
| JP | 2018-090081 A | 6/2018 | | |
| JP | 2018090081 A | * 6/2018 | | |
| WO | WO-2007126084 A1 | * 11/2007 | ......... | B29C 45/2618 |
| WO | WO-2016027828 A1 | * 2/2016 | .............. | F16C 19/06 |

OTHER PUBLICATIONS

Mar. 3, 2021 Extended European Search Report issued in European Patent Application No. 20203556.4.

* cited by examiner

*Primary Examiner* — Randell J Krug (74) *Attorney, Agent, or Firm* — Oliff PLC (57) ABSTRACT

A ball screw nut includes a nut part and a pulley part integrally molded with the nut part on the outer peripheral side of the nut part and having external teeth. The pulley part has a cylindrical portion extending in an axial direction and facing the nut part in a radial direction, and an extended portion extending radially inward from the cylindrical portion and facing the nut part in the axial direction. A restriction part for restricting relative rotation of the nut part and the pulley part is provided between a facing surface of the extended portion facing the nut part and a facing surface of the nut part facing the extended portion.

4 Claims, 5 Drawing Sheets

BALL SCREW NUT, TURNING UNIT, AND METHOD FOR MANUFACTURING BALL SCREW NUT

CROSS-REFERENCE TO RELATED APPLICATION

This application claims priority to Japanese Patent Application No. 2019-194949 filed on Oct. 28, 2019, incorporated herein by reference in its entirety.

BACKGROUND

1. Technical Field

The disclosure relates to a ball screw nut, a turning unit, and a method for manufacturing the ball screw nut.

2. Description of Related Art

Japanese Patent Application Publication No. 2018-90081 discloses a steering device in which a driven pulley is integrally molded on an outer peripheral surface of a ball screw nut. Unevenness such as serration is provided on the outer peripheral surface of the ball screw nut so as to restrict relative rotation of the ball screw nut and the driven pulley in a circumferential direction. On an inner peripheral surface of the driven pulley integrally molded on the outer peripheral surface of the ball screw nut, unevenness to be fitted to the unevenness formed on the outer peripheral surface of the ball screw nut is formed.

SUMMARY

In the driven pulley integrally molded on the outer peripheral surface of the ball screw nut, a thick portion and a thin portion exist because the unevenness is formed on the inner peripheral surface of the driven pulley so as to correspond to the unevenness formed on the outer peripheral surface of the ball screw nut. In the thick portion of the driven pulley, thermal contraction is relatively large during the molding of the driven pulley, while in the thin portion of the driven pulley, the thermal contraction is relatively small during the molding of the driven pulley. As a result, an amount of thermal contraction of the driven pulley varies depending on the thickness of the driven pulley. This may affect accuracy in tooth tips of external teeth formed on the outer periphery of the driven pulley.

A ball screw nut according to a first aspect of the disclosure includes: a cylindrical nut part having, on an inner peripheral surface, a ball rolling groove in a helical shape; and a cylindrical pulley part integrally molded with the nut part on the outer peripheral side of the nut part and having external teeth. The pulley part includes a cylindrical portion extending in an axial direction and facing the nut part in a radial direction, and an extended portion extending radially inward from the cylindrical portion and facing the nut part in the axial direction. A restriction part for restricting relative rotation of the nut part and the pulley part is provided between a surface of the extended portion facing the nut part and a surface of the nut part facing the extended portion.

In the above aspect, with the restriction part being provided at a location where the nut part and the pulley part face each other in the axial direction, variations in the thickness of the pulley part can be easily reduced as compared to a case where the restriction part is provided at a location where the nut part and the pulley part face each other in the radial direction, for example. Hence, the variations in the amount of thermal contraction on the outer peripheral surface of the pulley part is reduced.

In the ball screw nut, an outer peripheral surface of the nut part and an inner peripheral surface of the cylindrical portion may have a circumferential surface over an entire axial range where the external teeth are formed. With the above configuration, as compared to a case where the outer peripheral surface of the nut part and the inner peripheral surface of the cylindrical portion do not have the circumferential surface over the entire axial range where the external teeth are formed, variations in the thickness of the pulley part can be reduced. It is thus possible to reduce variations in the amount of thermal contraction on the outer peripheral surface of the pulley part over the entire axial area where the external teeth are formed.

In the ball screw nut, the pulley part may be formed by insert molding on the outer periphery of the nut part using only a resin material as a molding material. With the above configuration, the pulley part is formed by insert molding using the resin material as the molding material, so that the pulley part can be reduced in weight more than a case where the pulley part is molded using a metal material.

In the ball screw nut, the pulley part may be formed by insert molding on the outer periphery of the nut part using a resin material containing metal powder as the molding material. When the pulley part is formed by insert molding on the outer periphery of the nut part, thermal contraction occurs in the pulley part during the insert molding of the pulley part. In a case where the pulley part is formed by insert molding using the molding material containing the metal powder, the amount of thermal contraction of the pulley part during the insert molding can be made small as compared to a case where the pulley part is formed by insert molding using the molding material containing only the resin material. Therefore, variations in the amount of thermal contraction on the outer peripheral surface of the pulley part are further reduced.

In the ball screw nut, one of the facing surface of the nut part and the facing surface of the pulley part may have a projection, the other of the facing surface of the nut part and the facing surface of the pulley part may have a recess into which the projection is fitted, and the restriction part may be configured to include the projection and the recess.

With the above configuration, the relative rotation of the nut part and the pulley part can be restricted by the fitting of the projection into the recess. A turning unit according to a second aspect of the disclosure includes a motor and a transmission mechanism. The transmission mechanism includes the ball screw nut, a ball screw shaft having a ball rolling groove helically formed on an outer peripheral surface, a plurality of balls provided between the ball rolling groove of the ball screw shaft and a ball rolling groove of the ball screw nut, a drive pulley connected to a rotary shaft of the motor and having external teeth on an outer peripheral surface, and a toothed belt having internal teeth that mesh with the external teeth of the drive pulley and the external teeth of the pulley part, the toothed belt being stretched between the drive pulley and the pulley part.

With the above configuration, a rotational force of the motor is transmitted from the drive pulley connected to the rotary shaft of the motor to the pulley part via the toothed belt. The nut part rotates integrally with the pulley part. A rotational force of the nut part is converted to axial movement of the ball screw shaft by the balls rolling between the ball rolling groove of the nut part and the ball rolling groove of the ball screw shaft. In the ball screw nut, a decrease in accuracy of the tooth tips of the external teeth on the pulley part is prevented, and hence degradation in meshing with the internal teeth of the toothed belt can be prevented. It is thereby possible to prevent a decrease in transmission efficiency for transmitting the rotational force of the motor to the nut part.

In a method of manufacturing the ball screw nut according to a third aspect of the disclosure, the pulley part is integrally molded with the nut part by insert molding using the nut part as an insert.

According to the ball screw nut, the turning unit, and the method for manufacturing the ball screw nut of the disclosure, it is possible to prevent a decrease in the accuracy of the tooth tips of the external teeth on the pulley part.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
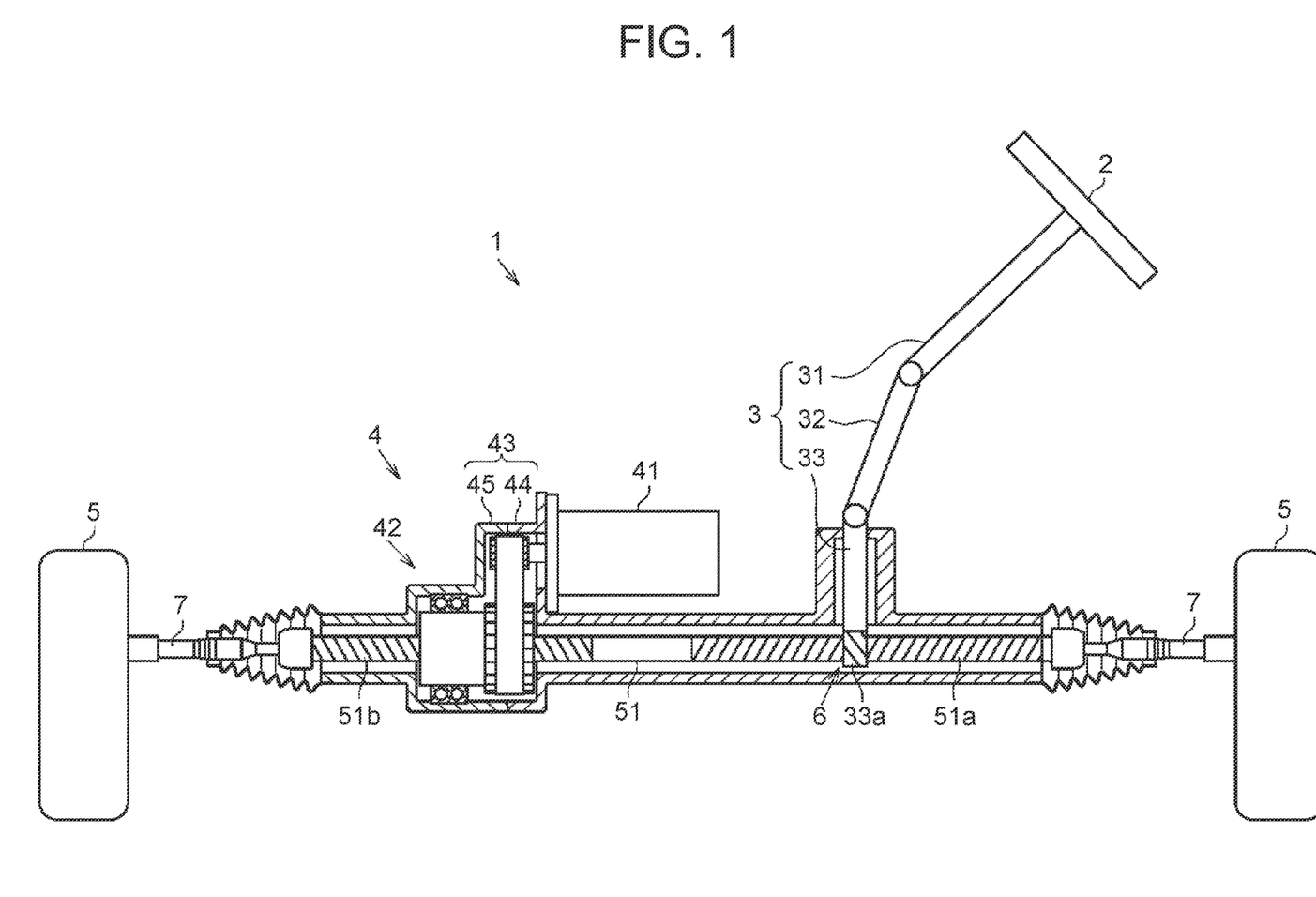
FIG. 1 is a schematic configuration diagram of an electric power steering device.

An embodiment of an electric power steering device (hereinafter referred to as "EPS") provided with a ball screw nut will be described with reference to the drawings. As illustrated in FIG. 1, this EPS 1 is provided with a steering shaft 3 to which a steering wheel 2 is connected, and a turning unit 4 for turning a turning wheel 5 connected to each end of a rack shaft 51 as a ball screw shaft.

The steering shaft 3 is configured by connecting a column shaft 31, an intermediate shaft 32, and a pinion shaft 33 in this order from the steering wheel 2 side. The pinion shaft 33 has pinion teeth 33a formed over an entire circumference on the outer peripheral surface of an end part opposite to the steering wheel 2.

The turning unit 4 includes a motor 41, a transmission mechanism 42, and a housing 43 through which a rack shaft 51 is inserted so as to be movable reciprocally and which stores the transmission mechanism 42. Rack teeth 51a are formed on the rack shaft 51 over a predetermined axial range. The housing 43 is formed by axially connecting a first housing 44 and a second housing 45 each formed in a cylindrical shape. The pinion shaft 33 and the rack shaft 51 are disposed at a predetermined crossing angle in the first housing 44. The rack teeth 51a formed on the rack shaft 51 and the pinion teeth 33a formed on the pinion shaft 33 are meshed with each other to form a rack and pinion mechanism 6. A tie rod 7 is connected to each end of the rack shaft 51. A tip of the tie rod 7 is connected to a knuckle (not illustrated) to which the turning wheel 5 is assembled. Accordingly, in the EPS 1, rotation of the steering shaft 3 accompanying a steering operation is converted to axial movement of the rack shaft 51 by the rack and pinion mechanism 6, and the axial movement is transmitted to the knuckle via the tie rod 7, thereby changing a turning angle of the turning wheel 5, that is, a traveling direction of a vehicle.

Figure 2:
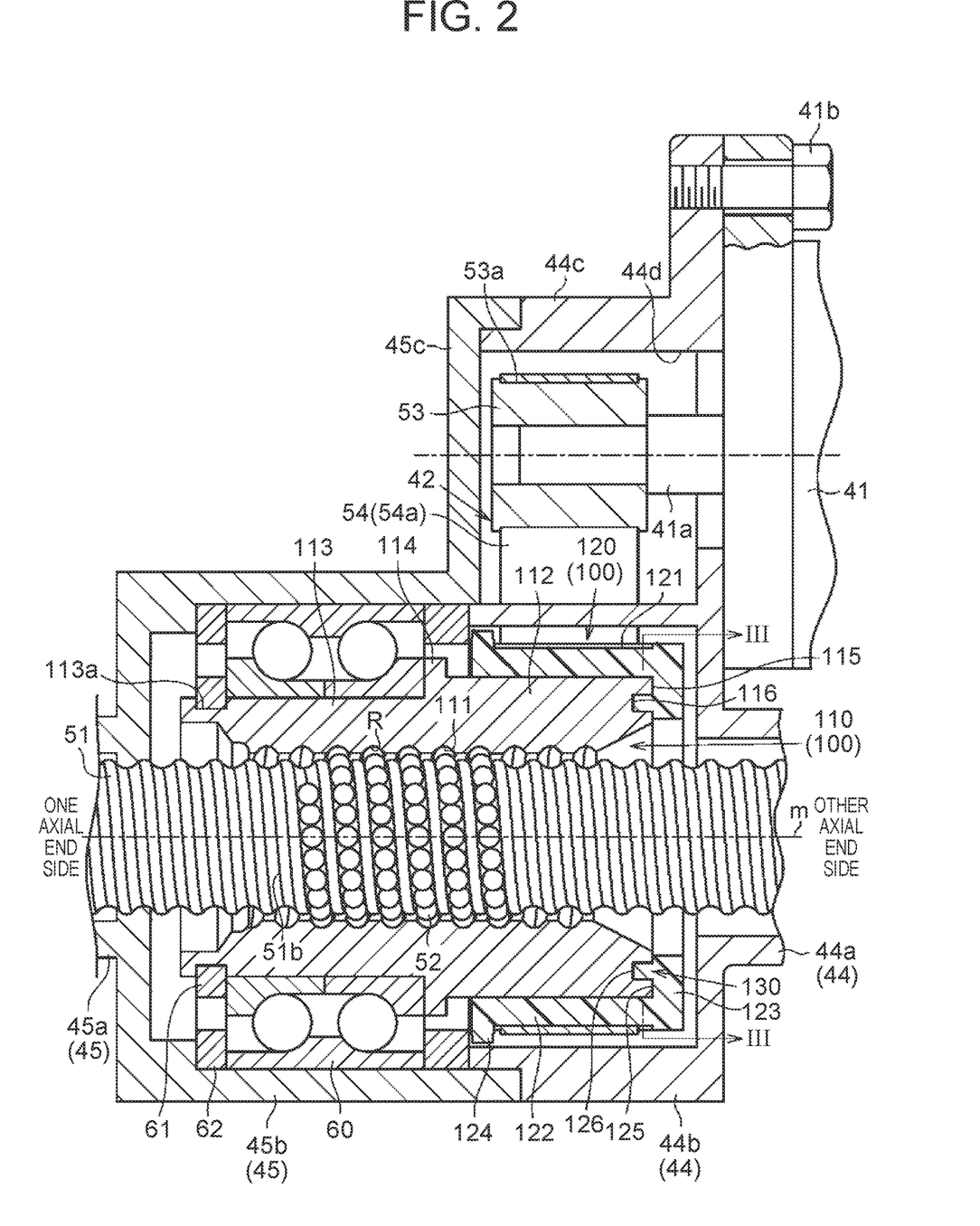
FIG. 2 is a sectional view taken along an axial direction in a vicinity of a transmission mechanism of the electric power steering device.

The turning unit 4 will be described in detail. In the following description, for convenience of description, an opposite side of the rack shaft 51 from the rack and pinion mechanism 6, that is, a left side of FIG. 2, is defined as one axial end side. The rack and pinion mechanism 6 side of the rack shaft 51, that is, a right side of FIG. 2, is defined as the other axial end side.

As illustrated in FIG. 2, the first housing 44 has a first cylindrical portion 44a and a first storage 44b formed on one axial end side of the first cylindrical portion 44a. The first storage 44b is formed in a cylindrical shape having a diameter larger than that of the first cylindrical portion 44a. The first storage 44b is formed with a bulge 44c having a shape in which a part of a peripheral wall thereof bulges to a side where the motor 41 is disposed. An insertion hole 44d penetrating the rack shaft 51 in the axial direction is formed in an end wall of the bulge 44c.

The second housing 45 has a second cylindrical portion 45a and a second storage 45b formed on the other axial end side of the second cylindrical portion 45a. The second storage 45b is formed in a cylindrical shape having a diameter larger than that of the second cylindrical portion 45a. A cover part 45c covering an opening of the bulge 44c of the first housing 44 is formed in the second storage 45b.

A rotary shaft 41a of the motor 41 is inserted in the bulge 44c via the insertion hole 44d formed in the bulge 44c. The motor 41 is attached to the first housing 44 with a bolt 41b in such a manner that the rotary shaft 41a is parallel to the rack shaft 51.

The transmission mechanism 42 includes the rack shaft 51 as the ball screw shaft, a ball screw nut 100 coaxially disposed on an outer periphery of the rack shaft 51, a plurality of balls 52 provided between the rack shaft 51 and the ball screw nut 100, a drive pulley 53 connected to the rotary shaft 41a of the motor 41, and a toothed belt 54.

The ball screw nut 100 is provided with a cylindrical nut part 110 having a ball rolling groove 111 helically formed on an inner peripheral surface, and a cylindrical pulley part 120 having external teeth 121. The pulley part 120 is integrally molded with the nut part 110 on an outer peripheral side of the nut part 110. The pulley part 120 is formed by insert molding on an outer periphery of the nut part 110 by using only a resin material as a molding material.

The nut part 110 is formed in a stepped cylindrical shape having different outer diameters. The nut part 110 has a large-diameter cylindrical portion 112 and a small-diameter cylindrical portion 113 provided on one axial end side of the large-diameter cylindrical portion 112. An outer diameter of the large-diameter cylindrical portion 112 is set larger than an outer diameter of the small-diameter cylindrical portion 113. An annular support 114, extending radially outward from the large-diameter cylindrical portion 112 and the small-diameter cylindrical portion 113, is formed between the large-diameter cylindrical portion 112 and the small-diameter cylindrical portion 113. An outer peripheral surface of the large-diameter cylindrical portion 112 forms a circumferential surface having a constant distance from a central axis to the outer peripheral surface. The nut part 110 is made of a metal material such as iron.

To an outer periphery of the small-diameter cylindrical portion 113, a bearing 60 is fitted so as to be adjacent to an end face on the one axial end side of the support 114, and a retainer 61 is fitted so as to be adjacent to an end face on the one axial end side of an inner ring of the bearing 60. In a portion on an outer periphery of the small-diameter cylindrical portion 113 closer to the one axial end side, an annular fixing groove 113a extending over an entire circumference of the portion is formed. A part of the retainer 61 is caulked so as to come into close contact with the fixing groove 113a, whereby the bearing 60 is fixed in a state where an end face on the other axial end side of the inner ring of the bearing 60 is pressed against the support 114. Thereby, the ball screw nut 100 is rotatably supported in the first storage 44b and the second storage 45b. For the bearing 60, a double-row angular contact ball bearing is employed. The bearing 60 is pressurized by the retainer 61 such that an internal gap of the bearing 60 becomes a set gap.

A holding part 62 is disposed adjacent to each side of an outer ring of the bearing 60 in the axial direction. An elastic body such as rubber or a metal spring is used for the holding part 62. The holding part 62 is disposed in a compressed state between the first housing 44 and an end face on the other axial end side of the outer ring of the bearing 60 and between the second housing 45 and an end face on one axial end side of the outer ring of the bearing 60. As a result, the outer ring of the bearing 60 is elastically supported with respect to the first housing 44 and the second housing 45.

The ball rolling groove 111 is helically formed on the inner peripheral surface of the nut part 110. A ball rolling groove 51b corresponding to the ball rolling groove 111 is helically formed on an outer peripheral surface of the rack shaft 51. The ball rolling groove 111 formed in the nut part 110 and the ball rolling groove 51b formed in the rack shaft 51 face each other. By the ball rolling grooves 111 and the ball rolling grooves 51b facing each other, a helical rolling path R is formed. The plurality of balls 52 are arranged in the rolling path R while being sandwiched between the ball rolling groove 111 and the ball rolling groove 51b. That is, the nut part 110 is screwed to the outer periphery of the rack shaft 51 via the plurality of balls 52. Thereby, each ball 52 rolls in the rolling path R while receiving a load due to relative rotation of the rack shaft 51 and the nut part 110. Relative axial positions of the rack shaft 51 and the nut part 110 are displaced by the rolling of each ball 52, so that a torque of the motor 41 is applied to the rack shaft 51 as an assist force. Although not illustrated, the nut part 110 is provided with a circulation path that opens at two points of the rolling path R and short-circuits the opening portions at the two points. The plurality of balls 52 can circulate indefinitely in the rolling path R via the circulation path.

Figure 3:
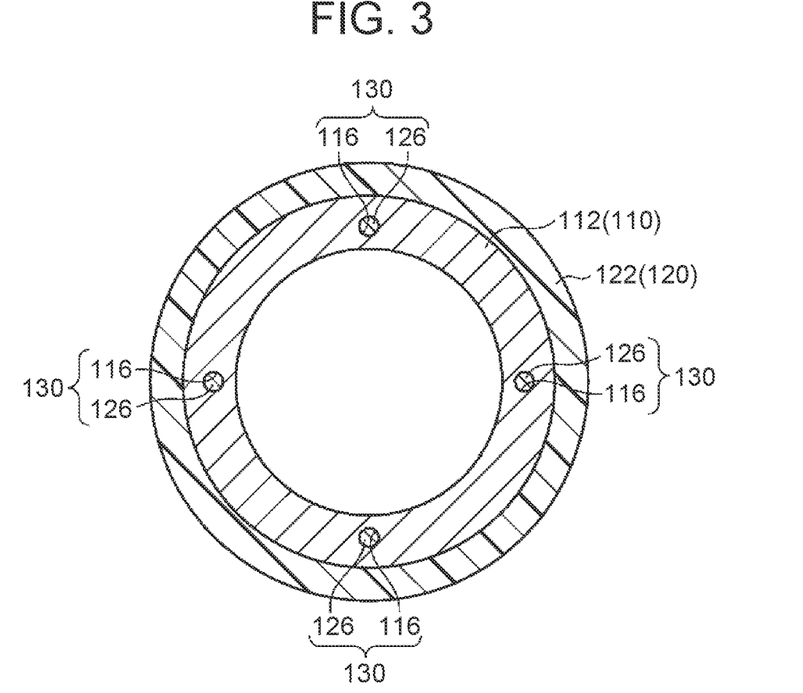
FIG. 3 is a sectional view taken along line III-III in FIG. 2 and orthogonal to an axial direction of a ball screw nut in which external teeth are not illustrated.

As illustrated in FIG. 3, a plurality of recesses 116 are formed in an end face on the other axial end side of the nut part 110. The end face on the other axial end side of the nut part 110 is a surface 115 facing the pulley part 120 in the axial direction, as described later. The plurality of recesses 116 are arranged at equal intervals in the circumferential direction. In the present embodiment, four recesses 116 are formed in the facing surface 115. Each recess 116 is formed at a radially intermediate position between an outer peripheral edge and an inner peripheral edge in the facing surface 115 of the nut part 110. Each recess 116 is a circular hole. Each recess 116 is formed in advance before the pulley part 120 is integrally molded with the nut part 110.

As illustrated in FIG. 2, the pulley part 120 is formed in a stepped bottomed cylindrical shape having different inner diameters. The pulley part 120 has a cylindrical portion 122, an extended portion 123 formed on the other axial end side of the cylindrical portion 122, and a flange 124 formed on one axial end side of the cylindrical portion 122. An inner diameter of the cylindrical portion 122 is set larger than an inner diameter of the extended portion 123. The pulley part 120 is made of a resin material.

The cylindrical portion 122 has a cylindrical shape extending in the axial direction. The cylindrical portion 122 is integrally molded on the outer peripheral surface of the large-diameter cylindrical portion 112 of the nut part 110. An inner peripheral surface of the cylindrical portion 122 forms a circumferential surface having a constant distance from the central axis to the inner peripheral surface. With the pulley part 120 being integrally molded with the nut part 110, the inner peripheral surface of the cylindrical portion 122 and the outer peripheral surface of the large-diameter cylindrical portion 112 are in close contact with each other in the radial direction. External teeth 121 are formed on the outer peripheral surface of the cylindrical portion 122. Tooth traces of the external teeth 121 are formed at equal intervals in the circumferential direction. The external teeth 121 are formed as inclined teeth in which the tooth traces are inclined relative to the axial direction. The external teeth 121 are formed over an entire circumferential area and over an entire axial area on the outer peripheral surface of the cylindrical portion 122.

The extended portion 123 has a cylindrical shape having an inner diameter smaller than the inner diameter of the cylindrical portion 122. The extended portion 123 extends radially inward from a surface on the other axial end side of the cylindrical portion 122. The inner diameter of the extended portion 123 is set larger than an inner diameter of the nut part 110 and an outer diameter of the rack shaft 51. That is, the extended portion 123 is located radially outward from the inner peripheral surface of the nut part 110 and the outer peripheral surface of the rack shaft 51. A facing surface 125 on one axial end side of the extended portion 123 and the facing surface 115 on the other axial end side of the nut part 110 face each other in the axial direction. With the pulley part 120 being integrally molded with the nut part 110, the facing surface 115 and the facing surface 125 are in close contact with each other in the axial direction.

The flange 124 has a cylindrical shape having an outer diameter larger than an outer diameter of the cylindrical portion 122. The flange 124 extends radially outward from a surface on one axial end side of the cylindrical portion 122. The flange 124 is formed on one axial end side of the external teeth 121.

As illustrated in FIG. 3, a plurality of projections 126 are formed on the facing surface 125 on the one axial end side of the extended portion 123. The plurality of projections 126 are formed in the same number as the plurality of recesses 116 and are arranged at equal intervals in the circumferential direction in the same manner as the recesses 116 is. That is, in the present embodiment, four projections 126 are formed on the facing surface 125. Each projection 126 has a cylindrical shape. Each projection 126 is formed when the pulley part 120 is integrally molded with the nut part 110. When the pulley part 120 is integrally molded with the nut part 110, each projection 126 is fitted into each recess 116 in a convex-concave manner, thereby forming a restriction part 130 that restricts the relative rotation of the nut part 110 and the pulley part 120 in the circumferential direction.

As illustrated in FIG. 2, the drive pulley 53 has a cylindrical shape. The drive pulley 53 is integrally rotatably mounted on an outer peripheral surface of the rotary shaft 41a of the motor 41. External teeth 53a are formed on an outer peripheral surface of the drive pulley 53. The external teeth 53a correspond to the external teeth 121 of the pulley part 120. Tooth traces of the external teeth 53a are formed at equal intervals in the circumferential direction. The external teeth 53a are formed as inclined teeth in which the tooth traces are inclined relative to the axial direction. The external teeth 53a are formed over an entire circumference on the outer peripheral surface of the drive pulley 53. The external teeth 53a are formed in an axial range excluding an end part on one axial end side and an end part on the other axial end side of the outer peripheral surface of the drive pulley 53. The external teeth 53a are inclined teeth inclined in the axial direction.

The toothed belt 54 is wound between the drive pulley 53 and the pulley part 120 of the ball screw nut 100 so as to generate a predetermined tension. Internal teeth 54a corresponding to the external teeth 53a of the drive pulley 53 and the external teeth 121 of the pulley part 120 are formed on an inner peripheral surface of the toothed belt 54. Tooth traces of the internal teeth 54a are formed at equal intervals in the circumferential direction. The internal teeth 54a are formed as inclined teeth in which the tooth traces are inclined relative to the axial direction, corresponding to the external teeth 53a and the external teeth 121 being the inclined teeth. The internal teeth 54a mesh with the external teeth 53a and the external teeth 121 in the circumferential direction. The toothed belt 54 is made of a resin material. The torque of the motor 41 is transmitted to the drive pulley 53 and the toothed belt 54, which are attached to the rotary shaft 41a, and the pulley part 120 of the ball screw nut 100 in this order, whereby the ball screw nut 100 rotates about an axis m.

A belt reducer for transmitting the rotation of a motor 41 to a ball screw nut 100 is made up of the pulley part 120, the drive pulley 53, and the toothed belt 54 of the integrally molded ball screw nut 100. The nut part 110, the rack shaft 51, and the balls 52 of the integrally molded ball screw nut 100 constitute a ball screw device for converting the rotation of a motor 41 transmitted via the belt reducer to axial movement of the rack shaft 51.

A formation range of the external teeth 121 in the axial direction is formed over the entire axial area on the outer peripheral surface of the cylindrical portion 122. In the present embodiment, the external teeth 121 are not formed on the outer peripheral surface of the extended portion 123. The restriction part 130 is provided only in a range excluding an inner peripheral portion of the pulley part 120 and an outer peripheral portion of the nut part 110 corresponding to the formation range of the external teeth 121. That is, the restriction part 130 is provided at a portion of the pulley part 120 which is not likely to affect a decrease in accuracy of the tooth tips of the external teeth 121.

Figure 4:
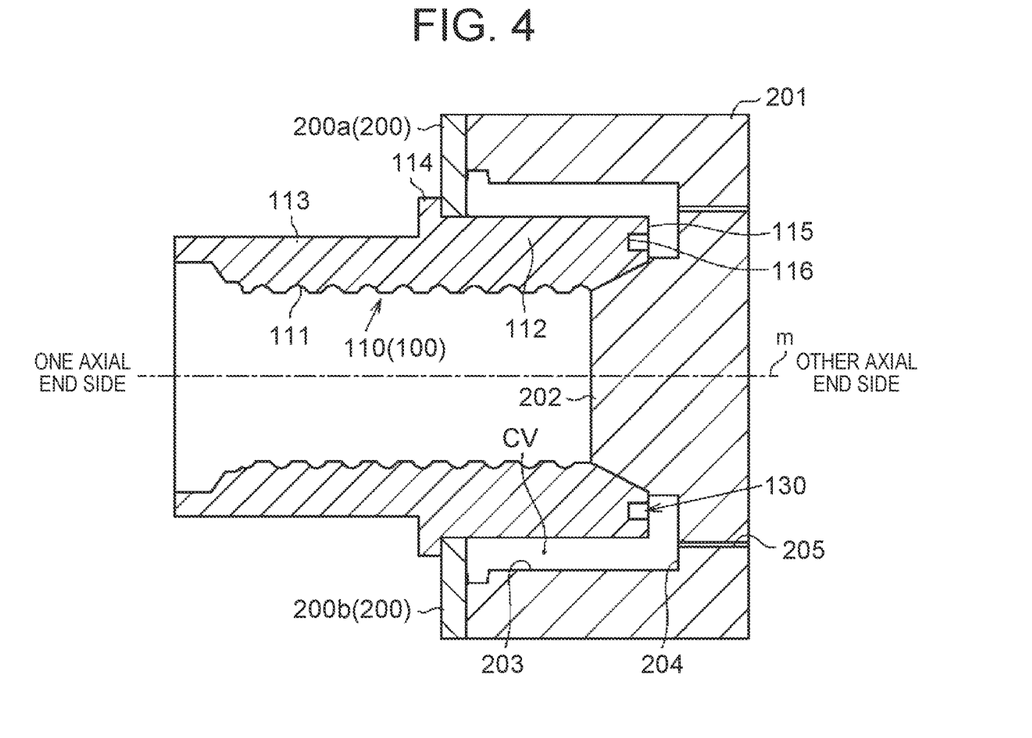
FIG. 4 is a sectional view taken along the axial direction in a state where no molten resin is injected in a cavity, while a mold for molding a pulley part is assembled to an outer periphery of the nut part.

A method for manufacturing the ball screw nut 100 will be described. As illustrated in FIG. 4, the nut part 110 is first manufactured prior to the integral molding of the pulley part 120 on the outer periphery of the nut part 110. The nut part 110 having the shape described above is manufactured by subjecting a cylindrical metal material to plastic working, for example, by cold forging. In the manufacturing, the ball rolling groove 111 is molded on the inner peripheral surface of the nut part 110, and the recess 116 to function as the restriction part 130 is molded on the facing surface 115 of the nut part 110.

After the molding of the nut part 110, the pulley part 120 is integrally molded on the outer periphery of the nut part 110. First, an annular first mold 200 and a bottomed cylindrical second mold 201 are assembled so as to cover the outer periphery of the molded nut part 110. An inner diameter of the first mold 200 is set equal to the outer diameter of the large-diameter cylindrical portion 112 of the nut part 110. The first mold 200 is attached to the outer peripheral surface of the large-diameter cylindrical portion 112 of the nut part 110 in a state of being adjacent to the other axial end side of the support 114 of the nut part 110. The first mold 200 is configured by combining mold pieces 200a, 200b formed by division into two pieces in the radial direction. The mold pieces 200a, 200b have the same shape. The second mold 201 is disposed on the outer peripheral side of the large-diameter cylindrical portion 112 with a gap formed radially outside the large-diameter cylindrical portion 112, while the second mold 201 is adjacent to the other axial end side of the first mold 200. The second mold 201 has an inner shaft part 202 abutting on an end part on the other axial end side of the inner peripheral surface of the nut part 110. The second mold 201 has, on an inner peripheral surface, an external teeth molding part 203 for molding the external teeth 121 of the pulley part 120. In the external teeth molding part 203, tooth traces corresponding to the external teeth 121 being the inclined teeth are formed at equal intervals. A resin injection port 205 penetrating in the axial direction is formed in a bottom 204 of the second mold 201. The nut part 110, the first mold 200, and the second mold 201 function as molds for molding the pulley part 120 which is a resin molded article. A space, surrounded by the outer peripheral surface of the large-diameter cylindrical portion 112 of the nut part 110, the facing surface 115 on the other axial end side of the nut part 110, a surface on the other axial end side of the first mold 200, the inner peripheral surface of the second mold 201, the bottom 204 of the second mold 201, and an outer peripheral surface of an inner shaft part 202 of the second mold 201, is a cavity CV for molding the pulley part 120. The cavity CV is shaped for forming the pulley part 120 by insert molding.

After the first mold 200 and the second mold 201 are assembled to the outer periphery of a nut part 110, a nozzle of a resin injection device for injecting molten resin is inserted into the resin injection port. The resin injection device starts the injection of the molten resin at a predetermined timing. The molten resin injected from the resin injection device passes through the resin injection port 205 and then fills the cavity CV. The resin injection device fills the cavity CV with the molten resin so as to keep the pressure of the molten resin in the cavity CV constant. The molten resin having filled the cavity CV is then cooled and solidified.

Figure 5:
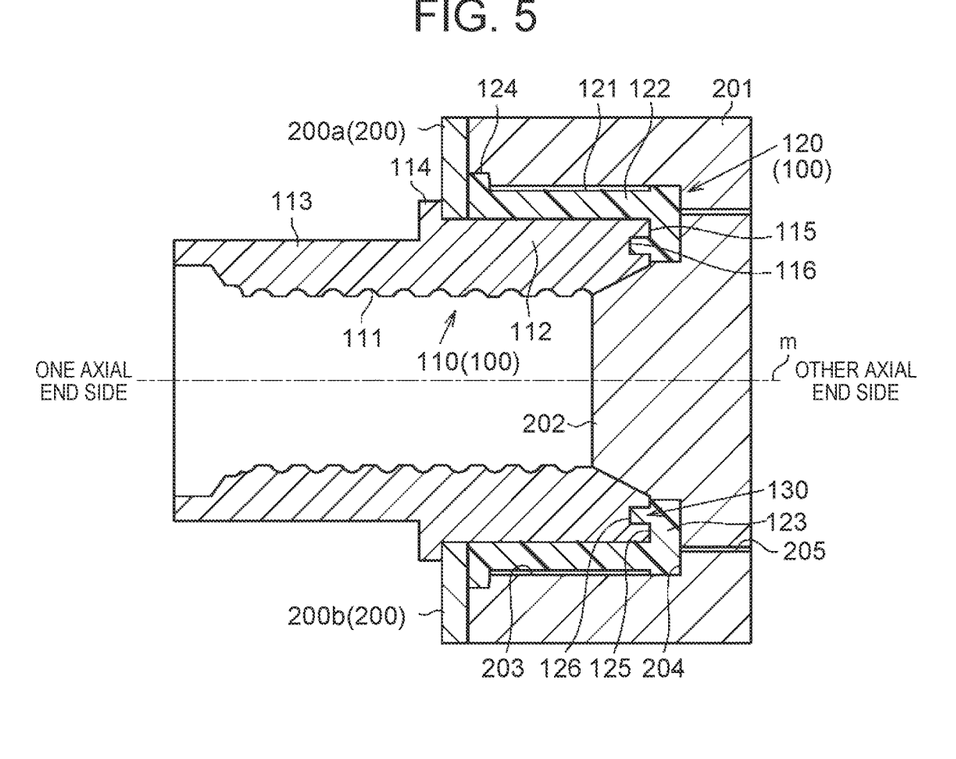
FIG. 5 is a sectional view along the axial direction in a state where after solidification of the molten resin, while the mold for molding the pulley part is assembled to the outer periphery of the nut part.

As illustrated in FIG. 5, when the solidification of the molten resin is completed, the first mold 200 and the second mold 201 are removed from the nut part 110 and the molded pulley part 120. At this time, the second mold 201 is removed toward the other axial end side while being rotated along the tooth traces of the inclined teeth of the external teeth 121 on the pulley part 120. This makes it possible to reduce an influence of the external teeth molding part 203 on the external teeth 121 at the time of removing the second mold 201. The first mold 200 is removed in the radial direction in a state of being divided into the mold pieces 200a, 200b. As a result, the manufacturing of the ball screw nut 100 in which the pulley part 120 is integrally molded on the outer periphery of the nut part 110 is completed.

The action of the present embodiment will be described. The restriction part 130 for restricting relative rotation in the circumferential direction between the nut part 110 and the pulley part 120 is provided not at a location where the large-diameter cylindrical portion 112 and the cylindrical portion 122 of the pulley part 120, where the external teeth 121 are formed, face each other, but between the facing surface 115 and the facing surface 125, which is a location where the nut part 110 and the pulley part 120 face each other in the axial direction. Therefore, variations in a radial thickness of the cylindrical portion 122 where the external teeth 121 are formed can be easily reduced as compared to a case where the restriction part is provided at a location where the nut part 110 and the pulley part 120 face each other in the radial direction, for example. In the present embodiment, since the inner peripheral surface of the cylindrical portion 122 forms the circumferential surface, the radial thickness of the cylindrical portion 122 is constant except for a thickness difference between the tooth tip and a tooth bottom of the external teeth 121. In the thick portion of the pulley part 120, the amount of thermal contraction during the molding is relatively large, while in the thin portion of the pulley part 120, the amount of thermal contraction during the molding is relatively small. Since the radial thickness of the cylindrical portion 122 is constant except for the thickness difference between the tooth tip and the tooth bottom of the external teeth 121, variations in the amount of thermal contraction on the outer peripheral surface of the pulley part 120 are reduced.

The effect of the present embodiment will be described. In the ball screw nut 100 in which a pulley part 120 is integrally molded on the outer periphery of the nut part 110, the radial thickness of the cylindrical portion 122 is constant except for the thickness difference between the tooth tip and the tooth bottom of the external teeth 121, whereby it is possible to prevent a decrease in the accuracy of the tooth tips of the external teeth 121 formed on the outer peripheral surface of the cylindrical portion 122.

Since each of the outer peripheral surface of the nut part 110 and the inner peripheral surface of the cylindrical portion 122 forms the circumferential surface, variations in the amount of thermal contraction on the outer peripheral surface of the pulley part 120 can be reduced, as compared to a case where the outer peripheral surface of the nut part 110 or the inner peripheral surface of the cylindrical portion 122 does not have the circumferential surface over the entire axial range where the external teeth 121 are formed.

The pulley part 120 is formed by insert molding using the resin material as the molding material, and hence the pulley part 120 can be reduced in weight more than a case where the pulley part 120 is molded using the metal material.

The pulley part 120 is integrally molded on the outer periphery of the nut part 110 such that the recess 116 formed in the facing surface 115 of the nut part 110 is fitted to the projection 126 formed on the facing surface 125 of the pulley part 120. Thus, when the nut part 110 and the pulley part 120 are relatively rotated in the circumferential direction, the recess 116 and the projection 126 abut on each other, so that the relative rotation of the nut part 110 and the pulley part 120 in the circumferential direction can be restricted. Further, the number of components of the transmission mechanism 42 can be reduced because it is not necessary to use a separate member such as a bolt for restricting the relative rotation of the nut part 110 and the pulley part 120.

The rotational force of the motor 41 is transmitted from the drive pulley 53 connected to the rotary shaft 41a of the motor 41 to the pulley part 120 of the ball screw nut 100 via the toothed belt 54. Since the relative rotation in the circumferential direction between the nut part 110 and the pulley part 120 is restricted by the restriction part 130, the nut part 110 rotates in the circumferential direction integrally with the pulley part 120. The rotational force of the nut part 110 is converted to the axial movement of the rack shaft 51 by the balls 52 rolling between the ball rolling groove 111 of the nut part 110 and the ball rolling groove 51b of the rack shaft 51. In the ball screw nut 100 of the present embodiment, a decrease in the accuracy of the tooth tips of the external teeth 121 on the pulley part 120 is prevented, and hence a deterioration in the meshing with the internal teeth 54a of the toothed belt 54 can be prevented. It is thereby possible to prevent a decrease in transmission efficiency for transmitting the rotational force of the motor 41 to the nut part 110.

When the nut part and the pulley part are not integrally molded but are separate bodies, it is necessary to form a clearance between the outer peripheral surface of the nut part and the inner peripheral surface of the pulley part so as to enable the pulley part to be assembled to the outer periphery of the nut part. In particular, when the pulley part is molded using the resin material, it is difficult to press-fit the pulley part to the outer periphery of the nut part, and there is thus no choice but to form a clearance. When the clearance is formed as thus described, there is a possibility that the pulley part is eccentrically assembled to the outer periphery of the nut part, so that a concentricity between an axial center of the nut part and an axial center of the pulley part decreases. In the present embodiment, with the pulley part 120 being integrally molded on the outer periphery of the nut part 110, the outer peripheral surface of the nut part 110 and the inner peripheral surface of the pulley part 120 can be brought into close contact with each other. This can lead to an improvement in the concentricity between the axial center of the nut part 110 and the axial center of the pulley part 120.

The above embodiment may be modified as follows. Moreover, the following other embodiments can be combined with each other to the extent that there is no technical contradiction. The external teeth 121 formed on the pulley part 120 are not limited to the inclined teeth but may be, for example, flat teeth in which the tooth trace is formed along the axial direction. The external teeth 53a formed on the drive pulley 53 and the internal teeth 54a formed on the toothed belt 54 are not limited to inclined teeth but may be, for example, flat teeth in which the tooth trace is formed along the axial direction.

In the present embodiment, the four recesses 116 have been formed in the facing surface 115, but the disclosure is not limited thereto. In the facing surface 115, one to three recesses 116 may be formed, or five or more recesses 116 may be formed. The four projections 126 have been formed on the facing surface 125, but the disclosure is not limited thereto. On the facing surface 125, one to three projections 126 may be formed, or five or more projections 126 may be formed.

In the present embodiment, the recesses 116 have been arranged in the facing surface 115 at equal intervals in the circumferential direction, but the recesses 116 may not be arranged at equal intervals. The projections 126 have been disposed on the facing surface 125 at equal intervals in the circumferential direction, but the projections 126 may not be arranged at equal intervals.

Figure 6:
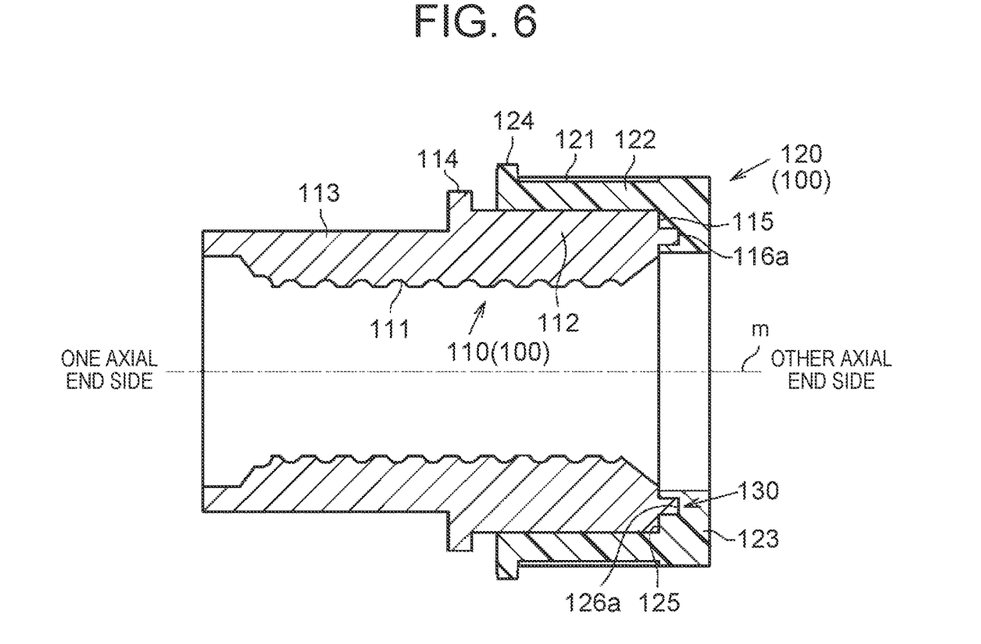
FIG. 6 is a cross-sectional view along an axial direction of a ball screw nut according to another embodiment.

In the present embodiment, the recess 116 has been formed in the facing surface 115 of the nut part 110, and the projection 126 has been formed in the facing surface 125 of the pulley part 120, but the disclosure is not limited thereto. As illustrated in FIG. 6, for example, a projection 116a may be formed on the facing surface 115 of the nut part 110, and a recess 126a to be fitted to the projection 116a may be formed in the facing surface 125 of the pulley part 120. In this case, the restriction part 130 is made up of the projection 116a formed on the facing surface 115 and the recess 126a formed in the facing surface 125.

Figure 7:
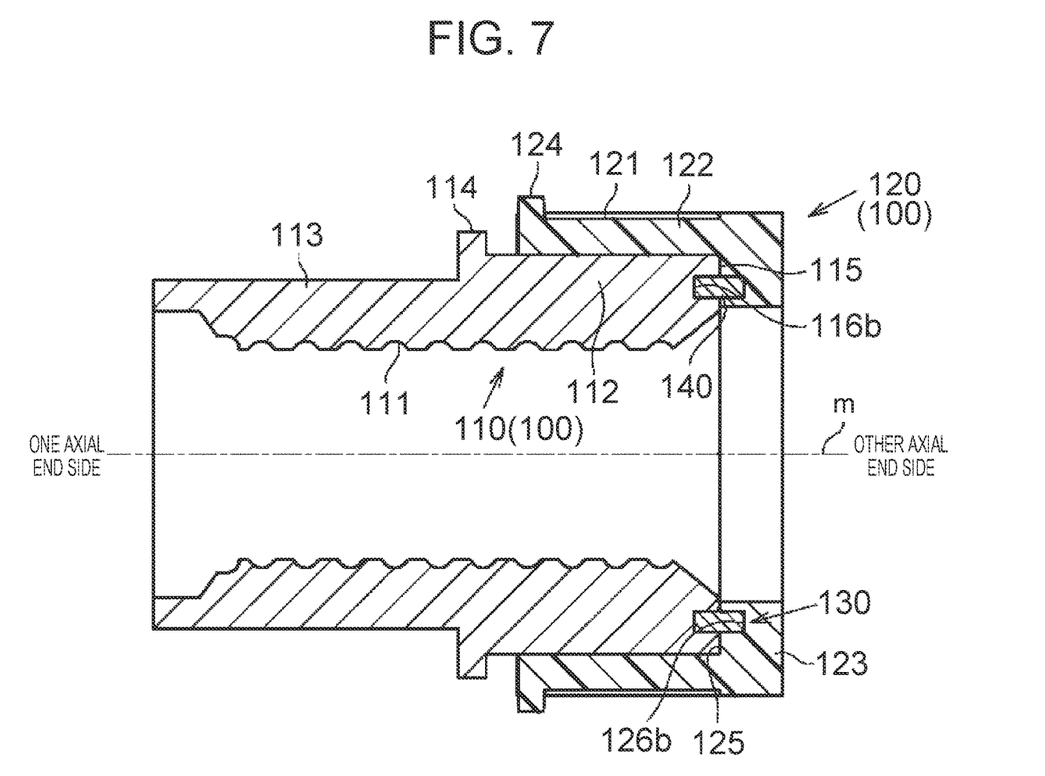
FIG. 7 is a cross-sectional view along an axial direction of a ball screw nut according to another embodiment.

As illustrated in FIG. 7, for example, a recess 116b may be formed in the facing surface 115 of the nut part 110, a recess 126b facing the recess 116b in the axial direction may be formed in the facing surface 125 of the pulley part 120, and a pin 140 as a separate member may be fitted into each of the recesses 116b, 126b. In this case, the restriction part 130 is made up of the recess 116b formed in the facing surface 115, the recess 126b formed in the facing surface 125, and the pin 140 as the separate member to be fitted into each of the recesses 116b and 126b. In a case where the restriction part 130 is formed using the pin 140 as the separate member, the ball screw nut 100 is manufactured by injecting molten resin into the cavity CV in a state where the pin 140 as the separate member is fitted in the recess 116b formed in the facing surface 115 at the time of assembling the first mold 200 and the second mold 201 to the outer periphery of the nut part 110.

The restriction part 130 has restricted the relative rotation of the nut part 110 and the pulley part 120 in the circumferential direction by the meshing of the recess 116 formed in the facing surface 115 of the nut part 110 with the projection 126 formed on the facing surface 125 of the pulley part 120 in a convex-concave manner, but the disclosure is not limited thereto. For example, a surface of the facing surface 115 of the nut part 110 may be roughened to increase friction on a surface of the facing surface 125 of the pulley part 120 with the facing surface 115. In this case, since minute unevenness for increasing the friction is formed on the surface of the facing surface 115 and minute unevenness for increasing the friction is also formed on the surface of the facing surface 125, a kind of convex-concave fitting takes place.

The pulley part 120 has been formed by insert molding on the outer periphery of the nut part 110 with only the resin material used as the molding material, but the disclosure is not limited thereto. For example, the pulley part 120 may be formed by insert molding on the outer periphery of the nut part 110 using a resin material containing metal powder as the molding material. That is, the pulley part 120 is not limited to being molded by resin molding but may be molded by metal powder injection molding. In a case where the pulley part 120 is formed by insert molding using the molding material containing the metal powder, the amount of thermal contraction of the pulley part 120 during the insert molding can be made small as compared to a case where the pulley part 120 is formed by insert molding using the molding material containing only the resin material. Therefore, variations in the amount of thermal contraction on the outer peripheral surface of the pulley part 120 can be further reduced.

In the pulley part 120, the flange 124 has been formed on the one axial end side of the cylindrical portion 122, but the flange 124 may be formed on the other axial end side of the cylindrical portion 122. The flange 124 may not be formed on the pulley part 120.

The external teeth 121 may be formed on the outer peripheral surface of the extended portion 123 in addition to the outer peripheral surface of the cylindrical portion 122. The outer peripheral surface of the large-diameter cylindrical portion 112 of the nut part 110 has formed the circumferential surface, and the inner peripheral surface of the pulley part 120 has formed the circumferential surface, but the disclosure is not limited thereto. The outer peripheral surface of the large-diameter cylindrical portion 112 and the inner peripheral surface of the pulley part 120 may each form a peripheral surface not being a perfect circumferential surface, such as a slightly elliptical peripheral surface.

The first mold 200 and the second mold 201 have been used as the molds for molding the pulley part 120, but the disclosure is not limited thereto, and the shapes and number of molds can be changed appropriately. For example, although the first mold 200 has been made up of the mold pieces 200a, 200b, the first mold 200 may be made up of three or more mold pieces. When the support 114 is not formed in the nut part 110, the first mold 200 may be made up of one mold piece. The second mold 201 may also be made up of a plurality of mold pieces.

The ball screw nut 100 is not limited to being embodied in the turning unit 4 but can also be embodied in other devices such as a machine tool. In the present embodiment, it has been shown that the ball screw nut 100 is embodied in the EPS 1 provided with the turning unit 4, but the disclosure is not limited thereto. For example, the device may be configured as a steering-by-wire-type steering device in which power transmission between a steering unit steered by a driver and the turning unit 4 for steering the turning wheels 5 in accordance with the steering by the driver is separated. In a case where the ball screw nut 100 is embodied in the steering-by-wire-type steering device, the embodiment is possible not only as a front-wheel steering device but also as a rear-wheel steering device or a four-wheel steering device.

What is claimed is:

1. A ball screw nut comprising:
 a cylindrical nut part having, on an inner peripheral surface, a ball rolling groove in a helical shape; and
 a cylindrical pulley part integrally molded with the cylindrical nut part on an outer peripheral side of the cylindrical nut part and having external teeth, wherein
 the cylindrical pulley part includes a cylindrical portion extending in an axial direction and facing the cylindrical nut part in a radial direction, and an extended portion extending radially inward from the cylindrical portion and facing the cylindrical nut part in the axial direction,
 a restriction part for restricting relative rotation of the cylindrical nut part and the cylindrical pulley part is provided between a facing surface of the extended portion facing the cylindrical nut part and a facing surface of the cylindrical nut part facing the extended portion,
 an outer peripheral surface of the cylindrical nut part and an inner peripheral surface of the cylindrical portion have a circumferential surface over an entire axial range where the external teeth are formed,
 the cylindrical pulley part is formed by insert molding on the an outer periphery of the cylindrical nut part using only a resin material as a molding material, and
 external teeth are formed on an outer peripheral surface of the cylindrical portion excluding an axial range where the extended portion is formed.

2. The ball screw nut according to claim 1, wherein
one of the facing surface of the cylindrical nut part and the facing surface of the cylindrical pulley part has a projection,
the other of the facing surface of the cylindrical nut part and the facing surface of the cylindrical pulley part has a recess into which the projection is fitted, and
the restriction part is configured to include the projection and the recess.

3. A turning unit comprising:
a motor; and
a transmission mechanism, wherein
the transmission mechanism includes the ball screw nut according to claim 1, a ball screw shaft having a ball rolling groove helically formed on an outer peripheral surface, a plurality of balls provided between the ball rolling groove of the ball screw shaft and the ball rolling groove of the ball screw nut, a drive pulley connected to a rotary shaft of the motor and having external teeth on an outer peripheral surface, and a toothed belt having internal teeth that mesh with the external teeth of the drive pulley and the external teeth of the cylindrical pulley part, the toothed belt being stretched between the drive pulley and the cylindrical pulley part.

4. A method for manufacturing the ball screw nut according to claim 1, wherein the cylindrical pulley part is integrally molded with the cylindrical nut part by insert molding using the cylindrical nut part as an insert.

\* \* \* \* \*